United States Patent
Dong (10) Patent No.: US 12,363,766 B2
(45) Date of Patent: Jul. 15, 2025

(54) DATA TRANSMISSION METHOD AND COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 503 days.

(21) Appl. No.: 17/786,657

(22) PCT Filed: Dec. 20, 2019

(86) PCT No.: PCT/CN2019/127051
§ 371 (c)(1),
(2) Date: Jun. 17, 2022

(87) PCT Pub. No.: WO2021/120182
PCT Pub. Date: Jun. 24, 2021

(65) Prior Publication Data
US 2023/0012583 A1    Jan. 19, 2023

(51) Int. Cl.
*H04W 74/08* (2024.01)
*H04L 1/00* (2006.01)
*H04W 74/0816* (2024.01)
*H04W 74/0833* (2024.01)

(52) U.S. Cl.
CPC ......... *H04W 74/085* (2013.01); *H04L 1/0003* (2013.01); *H04W 74/0816* (2013.01); *H04W 74/0891* (2013.01)

(58) Field of Classification Search
None
See application file for complete search history.

(56) References Cited

U.S. PATENT DOCUMENTS

| | | | |
|---|---|---|---|
| 2010/0124171 A1* | 5/2010 | Yoneyama | H04W 74/0825 370/242 |
| 2013/0229996 A1 | 9/2013 | Wang et al. | |
| 2017/0311289 A1 | 10/2017 | Kim et al. | |

OTHER PUBLICATIONS

European Patent Application No. 19956361.0, Search and Opinion dated Aug. 2, 2023, 11 pages.

* cited by examiner

Primary Examiner — Shukri Taha
(74) Attorney, Agent, or Firm — Cozen O'Connor (57) ABSTRACT

A data transmission method and a communication device are provided. Regarding the synchronization transmission of a plurality of transmission connections, in response to at least two of the plurality of transmission connections having different random backoff parameters, a frame length of a message frame transmitted by each transmission connection is determined based on a maximum random backoff parameter of the plurality of transmission connections.

15 Claims, 4 Drawing Sheets

DATA TRANSMISSION METHOD AND COMMUNICATION DEVICE

CROSS-REFERENCE TO RELATED APPLICATION

This application is a U.S. national phase of International Application No. PCT/CN2019/127051, filed with the State Intellectual Property Office of P. R. China on Dec. 20, 2019, the entire content of which is incorporated herein by reference.

TECHNICAL FIELD

The disclosure relates to, but is not limited to a field of wireless communication technologies, and particularly to a data transmission method and a communication device.

BACKGROUND

A study group (SG) has been founded by the Institute of Electrical and Electronics Engineers (IEEE) to study a next generation mainstream Wi-Fi technology, i.e., the IEEE802.11be standard. A scope of the study includes Wi-Fi transmission of 320 MHz bandwidth, aggregation and collaboration technologies using multiple frequency bands and so on. A proposed goal is to improve the rate and throughput by at least four times compared to the existing standard IEEE802.11 ax. The main application scenarios of the new technology include video transmission, augmented reality (AR), and virtual reality (VR), for example.

The aggregation and collaboration technology using multiple frequency bands refers to Wi-Fi devices simultaneously performing communication in multiple transmission connections using different frequency bands of 2.4 GHz, 5.8 GHz, 6-7 GHz and the like, or in multiple transmission connections using different bandwidths of a same frequency band.

SUMMARY

The disclosure provides a data transmission method and a communication device.

According to a first aspect of embodiments of the disclosure, a data transmission method is provided. The method is performed by a first communication device and includes: for a synchronization transmission of a plurality of transmission connections, determining a frame length of a message frame transmitted through each transmission connection based on a maximum random backoff parameter of the plurality of transmission connections, in response to at least two of the plurality of transmission connections having different random backoff parameters.

According to a second aspect of the embodiments of the disclosure, a data transmission method is provided. The method is performed by a second communication device and includes receiving a plurality of message frames transmitted in a synchronization transmission mode based on a plurality of transmission connections. A frame length of the message frame transmitted through each transmission connection is determined based on a maximum random backoff parameter of the plurality of transmission connections in response to at least two of the plurality of transmission connections having different random backoff parameters.

According to a third aspect of the embodiments of the disclosure, a communication device is provided. The communication device includes: a processor, a receiver, a memory and an executable program stored on the memory and executed by the processor. When the processor executes the executable program, steps of the data transmission method according to the first aspect or the second aspect are implemented.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

An execution subject involved in the embodiments of the disclosure includes but is not limited to a communication device in a wireless communication network, in particular Wi-Fi network, such as in the IEEE802.11a/b/g/n/ac standard, and a next generation of the Wi-Fi network, such as in the IEEE802.11.be standard. The communication device includes and is not limited to a wireless access point (AP) device such as a Wi-Fi router, a wireless station (STA), a user terminal, a user node, a mobile terminal or a tablet and so on.

Figure 1:
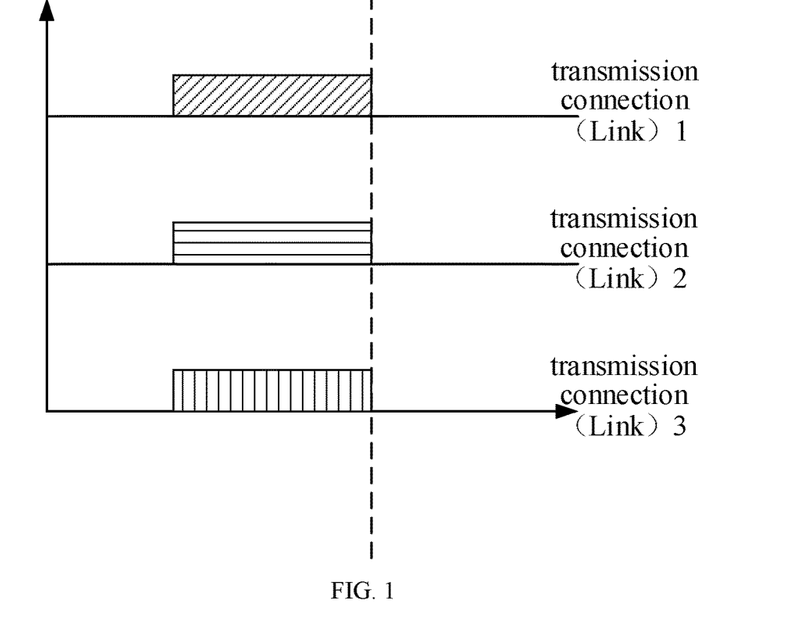
FIG. 1 is a schematic diagram illustrating a synchronization transmission mode based on a plurality of transmission connections according to an embodiment of the disclosure.
Figure 2:
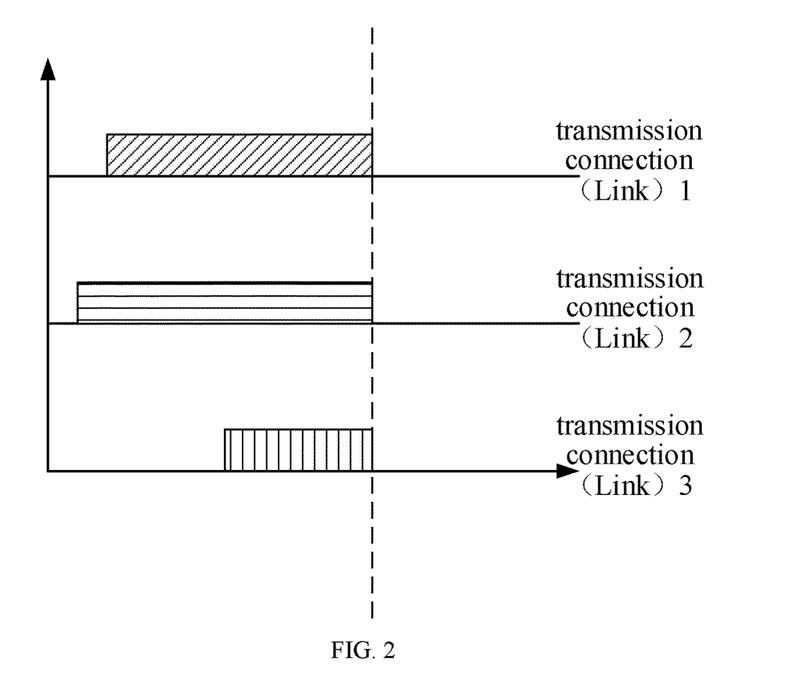
FIG. 2 is a schematic diagram illustrating a synchronization transmission mode based on a plurality of transmission connections according to another embodiment of the disclosure.

An application scenario of the embodiments of the disclosure may be that data frames are transmitted through multiple transmission connections. Based on the receive and transmit time of the data frame transmitted through each transmission connection, transmission of the data frames through the multiple transmission connections may include a synchronization transmission and an asynchronization transmission. An expected effect of the synchronization transmission is shown in FIG. 1 and FIG. 2. The synchronization transmission expects that the time that the data frames in the multiple transmission connections arrives at a data frame receiving end is the same. The synchronization transmission causes that a bandwidth occupied by each transmission connection at the same time is fully utilized, thus improving an effective utilization of frequency spectrum.

In a single connection transmission, the Wi-Fi communication device may access a channel in a listen before talking (LBT) mode. The Wi-Fi communication device needs to perform listening on a channel resource before sending data, and determines whether the channel resource is in a busy state based on a result of the listening. If yes, a random backoff parameter is generated, and after waiting for a random backoff duration determined based on the random backoff parameter, if the channel resource is in an idle state, the communication device determines that a transmission opportunity is acquired, and the channel resource is used to send data.

Since at least two transmission connections of the plurality of transmission connections have different random backoff parameters, or each of the plurality of transmission connections has a distinct random backoff parameter, the time that a data frame sending end sends the data frame varies with different transmission connections, such that the time that the data frame arrives at the receiving end in each transmission connection is affected, thus not achieving the synchronization transmission.

The disclosure provides a data transmission method and a communication device. According to the data transmission method and the communication device provided in the embodiments of the disclosure, for a synchronization transmission of a plurality of transmission connections, the communication device determines a frame length of a message frame transmitted through each transmission connection based on a maximum random backoff parameter of the plurality of transmission connections, in response to at least two of the plurality of transmission connections having different random backoff parameters. In this way, based on the maximum random backoff parameter, i.e., taking a time point that a data frame arrives at a data frame receiving end at the latest in the plurality of transmission connections as a reference, a transmission duration of the data frame can be adjusted by adjusting the frame length of the data frame transmitted through each transmission connection, and further a synchronization of the time that the data frame in each transmission connection arrives at the data frame receiving end can be achieved, thus reducing an occurrence of a situation where the data frames in the plurality of transmission connections arrive at the data frame receiving end at different time points, improving a success rate of the synchronization transmission and further improving an effective utilization of frequency spectrum.

Figure 3:
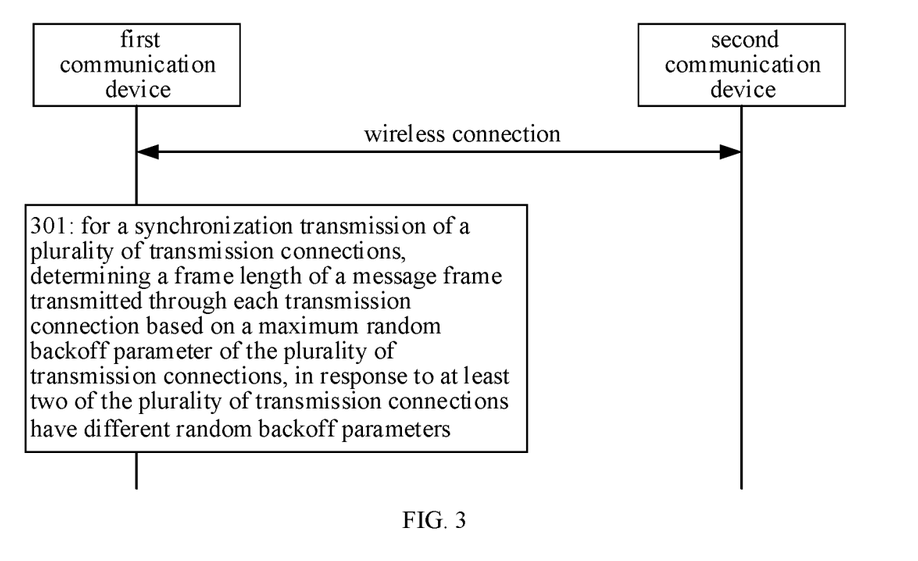
FIG. 3 is a flowchart illustrating a data transmission method according to an embodiment of the disclosure.

As illustrated in FIG. 3, a data transmission method is provided in an embodiment of the disclosure, which may be applied in a first communication device in a wireless communication. The method includes the followings.

At block 301, for a synchronization transmission of a plurality of transmission connections, in response to at least two of the plurality of transmission connections having different random backoff parameters, a frame length of a message frame transmitted through each transmission connection is determined based on a maximum random backoff parameter of the plurality of transmission connections.

The wireless communication may be the Wi-Fi communication of the IEEE802.11be standard. Here, the first communication device may be a data frame sending end in the Wi-Fi communication technology, and a second communication device may be a data frame receiving end in the Wi-Fi communication technology. The first communication device and the second communication device may perform transmission of data frames through the plurality of transmission connections.

Each transmission connection occupies a transmission frequency band. The plurality of transmission connections occupy a plurality of transmission frequency bands. The transmission frequency band may include a plurality of Wi-Fi working frequency bands, such as 2.4 GHz, 5.8 GHz and 6-7 GHz, or may be a frequency range of a bandwidth occupied by the transmission frequency band. A basis service set (BSS) may be formed on the occupied bandwidth, for example, the BSS of 20 MHz bandwidth is formed. The frequency ranges of the bandwidths occupied by different transmission frequency bands may belong to a same Wi-Fi working frequency band, or belong to different Wi-Fi working frequency bands. For example, three transmission connections are established between the first communication device and the second communication device. The three transmission connections may belong to three Wi-Fi working frequency bands including 2.4 GHz, 5.8 GHz and 6-7 GHz, respectively. Or, all the three transmission connections may belong to the Wi-Fi working frequency band of 2.4 GHz. The three transmission connections may use a same working bandwidth, for example the working bandwidth of 20 MHz. Or, the three transmission connections may use different working bandwidths, for example, the working bandwidths of 20 MHz, 40 MHz, 80 MHz, respectively.

The Wi-Fi communication device needs to perform listening on a channel resource before sending data, generates a random backoff parameter if the channel resource is in a busy state. After waiting for a random backoff duration determined based on the random backoff parameter, if the channel resource is in an idle state, the Wi-Fi communication device may use the channel resource to send data. One random backoff parameter may correspond to one time slot duration. That is, the random backoff duration corresponding to one random backoff parameter is one time slot duration, for example, one time slot duration may be 5 microseconds.

The message frame may be a data frame, a management frame and the like in the Wi-Fi communication. For a plurality of data frames synchronically transmitted through the plurality of transmission connections, since different transmission connections uses different random backoff parameters when accessing the communication channel, the time that different transmission connections send the data frames has an offset. For example, if the generated random backoff parameter is maximum (i.e., the random backoff duration is longest) when the data frame sending end performs transmission of the data frame using one transmission connection, then compared with other transmission connections of the plurality of transmission connections, the time of acquiring the transmission opportunity of the transmission connection is latest, such that the time that the data frame arrives at the data frame receiving end in of the transmission connection is latest when the synchronization transmission is adopted.

Here, the time that the data frame arrives at the data frame receiving end in each transmission connection can be adjusted based on the maximum random backoff parameter, i.e., taking the latest time that the data frames arrive at the data frame receiving end in the plurality of transmission connections as a reference.

In detail, the latest time that the data frame arrives at the data transmission receiving end is taken as the reference, to adjust the frame length of the message frame in each transmission connection, to ensure that the time that the data frames arrive at the data frame receiving end in all transmission connections is the same. For example, if the generated random backoff parameter is minimum when the data frame sending end performs transmission of the data frame using a certain transmission connection, then compared with the transmission connection with the maximum random backoff parameter, the time that the data frame transmitted using the certain transmission connection arrives at the data frame receiving end is earlier when the synchronization transmission is adopted by the data frame sending end. In this case, the frame length of the data frame in the transmission connection with the minimum random backoff parameter may be adjusted, to prolong a transmission duration of the data frame, such that the time that the data frame arrives at the data frame receiving end is postponed. An adjustment value of the frame length of the data frame in the transmission connection with the maximum random backoff parameter may be 0.

In this way, the transmission duration of the data frame may be adjusted by adjusting the frame length of the data frame in each transmission connection based on the maximum random backoff parameter, i.e., taking the latest time that the data frame arrives at the data frame receiving end in the plurality of transmission connections as a reference, so that the synchronization of the time that the data frames arrives at the data frame receiving end in all transmission connections may be achieved, thus reducing an occurrence of a situation where the time that the data frames arrives at the data frame receiving end in the plurality of transmission connections is different, improving a success rate of the synchronization transmission, and further improving an effective utilization of frequency spectrum.

In an embodiment, block 301 may include adding n bits to an original frame length of the message frame based on the maximum random backoff parameter and a random backoff parameter of the transmission connection through which the message frame is transmitted; where n is an integer greater than or equal to 0.

Here, the message frame may be a data frame or may be a request to send (RTS) frame sent before the data frame. By adding the n bits to the original frame length of the message frame, the transmission duration of the message frame is prolonged. By adjusting the number of the added bits, the time that the data frame arrives at the data frame receiving end in each transmission connection may be the same as the time that the data frame arrives at the data frame receiving end in the transmission connection with the maximum random backoff parameter, so that the time that the data frames arrive at the data frame receiving end in all transmission connections may be the same, thus further improving the success rate of the synchronization transmission. n may be 0, it indicates that the random backoff parameter of the transmission connection is the maximum random backoff parameter, and no bit needs to be added in the message frame.

The n bits may have preset values, so that the n bits added to the message frame can be determined after the data frame receiving end receives the message frame with the added n bits, the n bits added to the message frame may be removed and a data content of the message frame after the n bits removed may be read.

In an embodiment, a transmission duration of the n bits may be a product of a time slot duration and a difference between the maximum random backoff parameter and the random backoff parameter of the transmission connection through which the message frame is transmitted.

The random backoff duration corresponding to one random backoff parameter is one time slot duration. The difference between the random backoff parameter of each transmission connection and the maximum random backoff parameter may be determined as a time difference between the random backoff duration of each transmission connection and the maximum random backoff duration. A product of the random backoff parameter and the time slot duration is considered as the random backoff duration. The product of the time slot duration with the difference between the maximum random backoff parameter and the random backoff parameter of the transmission connection of the data frame is the difference between the random backoff duration of the transmission connection of the data frame and random backoff duration of the transmission connection with the maximum random backoff parameter.

Before the n bits are added, if the frame length and a modulation and coding scheme (MCS) of the message frame transmitted in each transmission connection are the same, the transmission duration of the message frame in each transmission duration is the same, and the time difference between the time that the message frames of the transmission connections arrive at the data frame receiving end is the difference between the random backoff durations of the transmission connections. The shorter the random backoff duration is, the earlier the message frame arrives at the data frame receiving end. The longer the random backoff duration is, the later the message frame arrives at the data frame receiving end. For each transmission connection, the number of added bits may be determined based on the difference between the random backoff duration of the transmission connection and the maximum random backoff duration, so that the time that the message frame of each transmission connection arrives at the data frame receiving end is the same as the time that the message frame in the transmission connection with the maximum random backoff parameter arrives at the data frame receiving end. By adding the bits, the transmission duration of the message frame may be prolonged, and further the time that the message frame arrives at the data frame receiving end may be postponed. The message frame may be a data frame, or may be a clear to send (CTS) frame.

For example, taking m transmission connections as an example, the random backoff parameter of the m-th transmission connection is i, and the maximum random backoff parameter of the plurality of transmission connections is j, where j is greater than i. The difference between the random backoff duration of the m-th transmission connection and the random backoff duration of the transmission connection with the maximum random backoff parameter is (j−i)*the time slot duration, i.e., the message frame of the m-th transmission connection arrives at the data frame receiving end before the message frame of the transmission connection with the maximum random backoff parameter. Here, n bits may be added to the original frame length of the message frame of the m-th transmission connection, n may be determined based on the difference between the random backoff durations, to ensure that the transmission duration of the n bits transmitted through the m-th transmission connection equals to the difference between the random backoff durations. In this way, the time that the message frame added with the n bits in the m-th transmission connection arrives at the data frame receiving end is that same as the time that the message frame of the transmission connection with the maximum random backoff parameter arrives at the data frame receiving end.

The number of bits added to the original frame length of the message frame of each transmission connection may be determined based on the time difference between the random backoff duration of each transmission connection and the maximum random backoff duration, so that the transmission duration of the added n bits equals to the time difference between the random backoff duration of each transmission connection and the maximum random backoff duration. The same number or different numbers of bits may be added to the original frame lengths of the message frames in different transmission connections.

In this way, by adding the n bits to prolong the transmission duration of the message frame, the difference between the random backoff durations generated due to different random backoff parameters can be compensated, thus improving a success rate of the synchronization transmission.

In an embodiment, adding the n bits to the original frame length of the message frame includes adding the n bits to an original frame length of a request to send (RTS) frame or a data frame in response to the message frame transmitted through the transmission connection including the RTS frame.

In order to suppress or reduce an influence of a hidden node on the transmission of the data frame, the Wi-Fi communication device may use a RTS/CTS mechanism. Before the data frame sending end sends the data frame, the data frame sending end may send the RTS frame to the data frame receiving end, and send the data frame again after waiting for the CTS frame feedback by the data frame receiving end.

When the transmission connection uses the RTS/CTS mechanism to transmit the data frame, the transmission connection transmits the RTS frame and the data frame. The data frame sending end may add the n bits to the RTS frame, to prolong the transmission duration of the RTS frame, so that the time that the data frame sent subsequent to the RTS frame arrives at the data frame receiving end is postponed.

By prolonging the transmission duration of the RTS frame, the difference with the random backoff duration of the transmission connection having the maximum random backoff parameter can be compensated, so that the time that the data frames in all transmission connections arrive at the data frame receiving end may be the same. After adding the n bits to the RTS frame, a length filed of the RTS frame is changed based on the length of the RTS frame added with the n bits. The length field is located in a signal (SIG) subdomain of a physical header of the RTS frame.

When the transmission connection uses the RTS/CTS mechanism to transmit the data frame, the data frame sending end may add n bits to the data frame, so as to prolong the transmission duration of the data frame, so that the time that the data frame arrives at the data frame receiving end may be postponed and further the difference with the random backoff duration of the transmission connection having the maximum random backoff parameter can be compensated, to ensure that the time that the data frame of each transmission connection arrives at the data frame receiving end may be the same. Here, the n bits may be added to an end of the data frame. After adding the n bits to the data frame, the length field in the data frame needs to be changed based on the length of the data frame added with the n bits. The length field is located in a signal (SIG) subdomain of a physical header of the data frame.

The n bits may have preset values, such that the data frame receiving end may determine the n bits added to the message frame after receiving the RTS frame or data frame added with the n bits, removes the n bits added to the RTS frame or data frame, and reads a data content of the RTS frame or data frame after the n bits are removed.

In an embodiment, adding the n bits to the original frame length of the message frame may include adding the n bits to an original frame length of a data frame in response to the message frame transmitted through the transmission connection including no RTS frame.

The transmission connection may not use the RTS/CTS mechanism to transmit the data frame, i.e., the transmission connection is not used to transmit the RTS frame and the CTS frame. Here, the data frame sending end may add n bits to the data frame, to prolong the transmission duration of the data frame, so that the time that the data frame arrives at the data frame receiving end may be postponed and further the difference with the random backoff duration of the transmission connection having the maximum random backoff parameter can be compensated, to ensure that the time that the data frame of each transmission connection arrives at the data frame receiving end may be the same. Here, the n bits may be added to an end of the data frame. After adding the n bits to the data frame, the length field in the data frame needs to be changed based on the length of the data frame added with the n bits. The length field is located in a signal (SIG) subdomain of a physical header of the data frame.

The n bits may have preset values, such that the data frame receiving end may determine the n bits added to the message frame after receiving the data frame added with the n bits, removes the n bits added to the data frame, and reads a data content of the data frame after the n bits are removed.

In this way, by adding a predetermined content to the message frame such as the RTS frame and the data frame, the transmission duration of the message frame is prolonged, so that the time that the data frame of each transmission connection arrives at the data frame receiving end equals to the time that the data frame of the transmission connection having the maximum radon backoff parameter arrives at the data frame receiving end, thus improving a success rate of the synchronization transmission.

Figure 4:
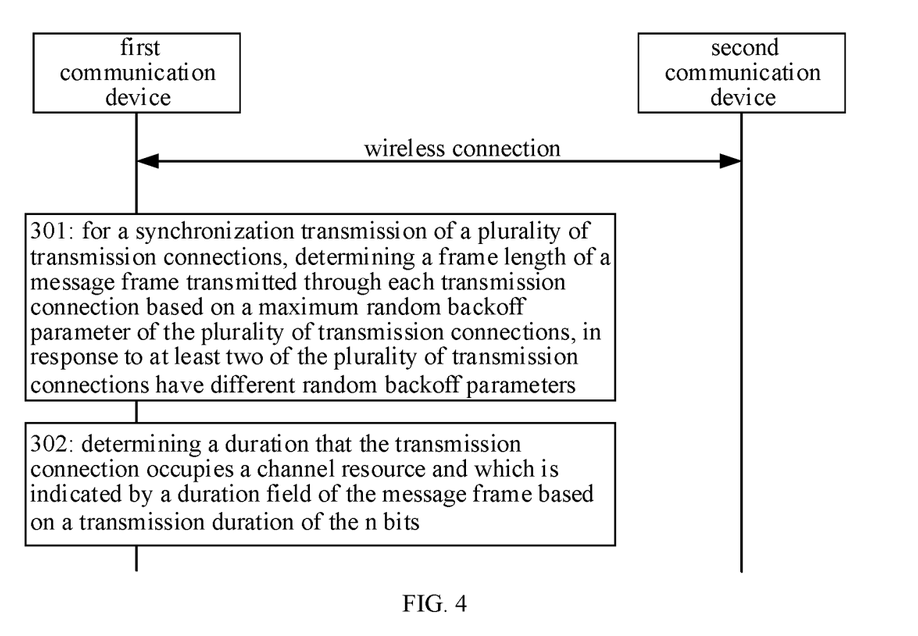
FIG. 4 is a flowchart illustrating a data transmission method according to another embodiment of the disclosure.

In an embodiment, as illustrated in FIG. 4, the data transmission method may further include the followings.

At block 302, a duration that the transmission connection occupies a channel resource and which is indicated by a duration field of the message frame is determined based on a transmission duration of the n bits.

When the transmission connection uses the RTS/CTS mechanism to transmit the data frame, n bits may be added to the RTS frame or data frame. The data frame sending end may set the duration indicated by the duration field of the RTS frame of each transmission connection to: the transmission duration of the data frame+the transmission duration of the CTS fame+3*a duration of a short interframe space (SIFS)+a duration of an ACK frame+(maximum random backoff parameter−the random backoff parameter of a current transmission connection)*the time slot duration. The transmission duration of the data frame may be the transmission duration of the original data frame not added with the n bits, while (maximum random backoff parameter−the random backoff parameter of a current transmission connection)*the time slot duration is the transmission duration of the n bits in the RTS frame. Here, the duration field may be located in an MAC frame header of the RTS frame. When the data frames are continuous data frames, there is a SIFS between sub-frames in each continuous data frame, and the duration related to the SIFS in the duration indicated by the duration field may be set to: (the number of sub-frames+3)*the duration of the SIFS.

When the transmission connection uses the RTS/CTS mechanism to transmit the data frame, n bits may be added to the RTS frame or data frame. The data frame receiving end may send the CTS frame to the data frame sending end after receiving the RTS frame. If the duration indicated by the duration field in the received RTS frame includes the transmission duration of the n bits, the data frame receiving end may set the duration indicated by the duration field of the CTS frame to: the transmission duration of the original data frame+the transmission duration of the CTS fame+ 2*the duration of the SIFS+a duration of the ACK frame+ (maximum random backoff parameter−the random backoff parameter of the current transmission connection)*the time slot duration. The transmission duration of the data frame may be the transmission duration of the original data frame not added with the n bits. The duration field may be located in an MAC frame header of the CTS frame. When the data frames are continuous data frames, there is a SIFS between sub-frames in each continuous data frame, and the duration related to the SIFS in the duration indicated by the duration field may be set to: (the number of sub-frames+2)*the duration of the SIFS.

When the transmission connection uses the RTS/CTS mechanism to transmit the data frame, n bits may be added to the RTS frame or data frame. The data frame sending end may set the duration indicated by the duration field of the data frame of each transmission connection to: the transmission duration of the data frame+the transmission duration of the CTS fame+1*the duration of the SIFS+the duration of the ACK frame+(maximum random backoff parameter−the random backoff parameter of the current transmission connection)*the time slot duration. The transmission duration of the data frame may be the transmission duration of the original data frame not added with the n bits. When the data frames are continuous data frames, there is a SIFS between sub-frames in each continuous data frame, and the duration related to the SIFS in the duration indicated by the duration field may be set to: (the number of sub-frames+1)*the duration of the SIFS.

When the transmission connection does not use the RTS/CTS mechanism to transmit the data frame, n bits may be added to the data frame. The data frame sending end may set the duration indicated by the duration field of the data frame of each transmission connection to: the transmission duration of the data frame+the transmission duration of the CTS fame+1*the duration of the SIFS+the duration of the ACK frame+(maximum random backoff parameter−the random backoff parameter of the current transmission connection) *the time slot duration. The transmission duration of the data frame may be the transmission duration of the original data frame not added with the n bits. When the data frames are continuous data frames, there is a SIFS between sub-frames in each continuous data frame, and the duration related to the SIFS in the duration indicated by the duration field may be set to: (the number of sub-frames+1)*the duration of the SIFS.

In an embodiment, the data transmission method may further include using a same modulation and coding scheme (MCS) for the n bits added to the message frame and a content other than the n bits in the message frame.

When the n bits are added to the original frame length of the RTS frame, the n bits added to the RTS frame and the content other than the n bits in the RTS frame may use the same MSC, in this way, an efficiency of processing the RTS frame may be improved.

When the n bits are added to the original frame length of the data frame, the n bits added to the data frame and the content other than the n bits in the data frame may use the same MSC, in this way, an efficiency of processing the data frame may be improved.

When the data frame receiving end receives the RTS frame or data frame, a demodulation and decoding scheme corresponding to the MSC can be used to receive the RTS frame or data frame, thus improving a receiving efficiency.

Figure 5:
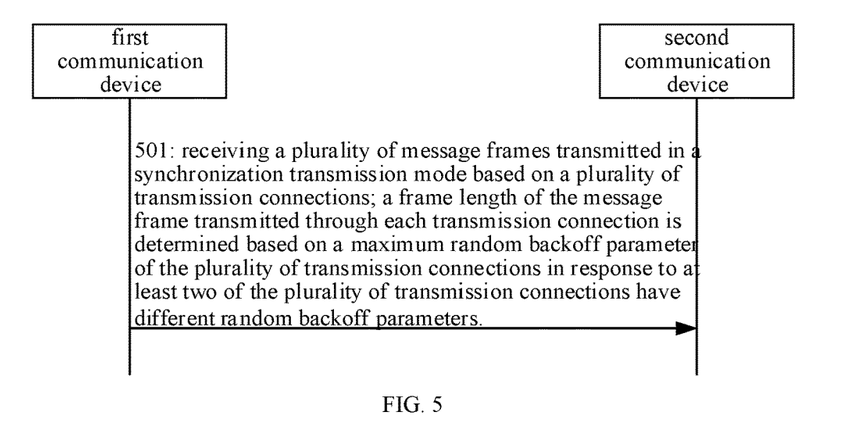
FIG. 5 is a flowchart illustrating a data transmission method according to another embodiment of the disclosure.

As illustrated in FIG. 5, a data transmission method is provided in an embodiment of the disclosure, which may be applied to a second communication device of the wireless communication. The method may include the followings.

At block 501, a plurality of message frames are received in a synchronization mode based on a plurality of transmission connections.

The frame length of the message frame of each transmission connection is determined based on a maximum random backoff parameter of the plurality of transmission connections in response to at least two of the plurality of transmission connections having different random backoff parameters.

The wireless communication may be the Wi-Fi communication of the IEEE802.11be standard. Here, the first communication device may be a data frame sending end in the Wi-Fi communication technology, and the second communication device may be a data frame receiving end in the Wi-Fi communication technology. The first communication device and the second communication device may perform transmission of data frames through the plurality of transmission connections.

Each transmission connection occupies a transmission frequency band. The plurality of transmission connections occupy a plurality of transmission frequency bands. The transmission frequency band may include a plurality of Wi-Fi working frequency bands, such as 2.4 GHz, 5.8 GHz and 6-7 GHz, or may be a frequency range of a bandwidth occupied by the transmission frequency band. A basis service set (BSS) may be formed on the occupied bandwidth, for example, the BSS of 20 MHz bandwidth is formed. The frequency ranges of the bandwidths occupied by different transmission frequency bands may belong to a same Wi-Fi working frequency band, or belong to different Wi-Fi working frequency bands. For example, three transmission connections are established between the first communication device and the second communication device. The three transmission connections may belong to three Wi-Fi working frequency bands including 2.4 GHz, 5.8 GHz and 6-7 GHz, respectively. Or, all the three transmission connections may belong to the Wi-Fi working frequency band of 2.4 GHz. The three transmission connections may use a same working bandwidth, for example the working bandwidth of 20 MHz. Or, the three transmission connections may use different working bandwidths, for example, the working bandwidths of 20 MHz, 40 MHz, 80 MHz, respectively.

The Wi-Fi communication device needs to perform listening on a channel resource before sending data, generates a random backoff parameter if the channel resource is in a busy state. After waiting for a random backoff duration determined based on the random backoff parameter, if the channel resource is in an idle state, the Wi-Fi communication device may use the channel resource to send data. One random backoff parameter may correspond to one time slot duration. That is, the random backoff duration corresponding to one random backoff parameter is one time slot duration, for example, one time slot duration may be 5 microseconds.

The message frame may be a data frame, a management frame and the like in the Wi-Fi communication. For a plurality of data frames synchronically transmitted through the plurality of transmission connections, since different transmission connections uses different random backoff parameters when accessing the communication channel, the time that different transmission connections send the data frames has an offset. For example, if the generated random backoff parameter is maximum (i.e., the random backoff duration is longest) when the data frame sending end performs transmission of the data frame using one transmission connection, then compared with other transmission connections of the plurality of transmission connections, the time of acquiring the transmission opportunity of the transmission connection is latest, such that the time that the data frame arrives at the data frame receiving end in the transmission connection is latest when the synchronization transmission is adopted.

Here, the time that the data frame arrives at the data frame receiving end in each transmission connection can be adjusted based on the maximum random backoff parameter, i.e., taking the latest time that the data frames arrive at the data frame receiving end in the plurality of transmission connections as a reference.

In detail, the latest time that the data frame arrives at the data transmission receiving end is taken as the reference, to adjust the frame length of the message frame in each transmission connection, to ensure that the time that the data frames arrive at the data frame receiving end in all transmission connections is the same. For example, if the generated random backoff parameter is minimum when the data frame sending end performs transmission of the data frame using a certain transmission connection, then compared with the transmission connection with the maximum random backoff parameter, the time that the data frame arrives at the data frame receiving end is earlier transmitted using the certain transmission connection when the synchronization transmission is adopted by the data frame sending end. In this case, the frame length of the data frame in the transmission connection with the minimum random backoff parameter may be adjusted, to prolong a transmission duration of the data frame, such that the time that the data frame arrives at the data frame receiving end is postponed. An adjustment value of the frame length of the data frame in the transmission connection with the maximum random backoff parameter may be 0.

In this way, the transmission duration of the data frame may be adjusted by adjusting the frame length of the data frame in each transmission connection based on the maximum random backoff parameter, i.e., taking the latest time that the data frame arrives at the data frame receiving end in the plurality of transmission connections as a reference, so that the synchronization of the time that the data frames arrives at the data frame receiving end in all transmission connections may be achieved, thus reducing an occurrence of a situation where the time that the data frames arrives at the data frame receiving end in the plurality of transmission connections is different, improving a success rate of the synchronization transmission, and further improving an effective utilization of frequency spectrum.

In an embodiment, the data transmission method may further include: in response to a received message frame including a request to send (RTS) frame, removing n bits added to the RTS frame and reading a data content of the RTS frame after the n bits are removed; or removing n bits added to a data frame included in the received message frame and reading a data content of the data frame after the n bits are removed; where n is an integer greater than or equal to 0.

In order to reduce an influence of a hidden node on the transmission of the data frame, the Wi-Fi communication device may use a RTS/CTS mechanism. Before the data frame sending end sends the data frame, the data frame sending end may send the RTS frame to the data frame receiving end, and send the data frame again after waiting for the CTS frame feedback by the data frame receiving end.

When the transmission connection uses the RTS/CTS mechanism to transmit the data frame, the transmission connection transmits the RTS frame and the data frame. The data frame sending end may add the n bits to the RTS frame, to prolong the transmission duration of the RTS frame, so that the time that the data frame sent subsequent to the RTS frame arrives at the data frame receiving end is postponed. By prolonging the transmission duration of the RTS frame, the difference with the random backoff duration of the transmission connection having the maximum random backoff parameter can be compensated, so that the time that the data frames in all transmission connections arrive at the data frame receiving end may be the same. After adding the n bits to the RTS frame, a length filed of the RTS frame is changed based on the length of the RTS frame added with the n bits. The length field is located in a signal (SIG) subdomain of a physical header of the RTS frame.

When the transmission connection uses the RTS/CTS mechanism to transmit the data frame, the data frame sending end may add n bits to the data frame, so as to prolong the transmission duration of the data frame, so that the time that the data frame arrives at the data frame receiving end may be postponed and further the difference with the random backoff duration of the transmission connection having the maximum random backoff parameter can be compensated, to ensure that the time that the data frame of each transmission connection arrives at the data frame receiving end may be the same. Here, the n bits may be added to an end of the data frame. After adding the n bits to the data frame, the length field in the data frame needs to be changed based on the length of the data frame added with the n bits. The length field is located in a signal (SIG) subdomain of a physical header of the data frame.

The n bits may have preset values, such that the data frame receiving end may determine the n bits added to the message frame after receiving the RTS frame or data frame added with the n bits, removes the n bits added to the RTS frame or data frame, and reads a data content of the RTS frame or data frame after the n bits are removed.

In an embodiment, the data transmission method may further include: determining a duration that the transmission connection occupies a channel resource and which is indicated by a duration field of a clear to send (CTS) frame based on a transmission duration of the n bits; and sending the CTS frame.

When the transmission connection uses the RTS/CTS mechanism to transmit the data frame, n bits may be added to the RTS frame or data frame. The data frame receiving end may send the CTS frame to the data frame sending end after receiving the RTS frame. If the duration indicated by the duration field in the received RTS frame includes the transmission duration of the n bits, the data frame receiving end may set the duration indicated by the duration field of the CTS frame to: the transmission duration of the original data frame+the transmission duration of the CTS fame+ 2*the duration of the SIFS+a duration of the ACK frame+ (maximum random backoff parameter-the random backoff parameter of the current transmission connection)*the time slot duration. The transmission duration of the data frame may be the transmission duration of the original data frame not added with the n bits. The duration field may be located in an MAC frame header of the CTS frame. When the data frames are continuous data frames, there is a SIFS between sub-frames in each continuous data frame, and the duration related to the SIFS in the duration indicated by the duration field may be set to: (the number of sub-frames+2)*the duration of the SIFS.

In an embodiment, the data transmission method may further include: removing n bits added to a data frame and reading a data content of the data frame after the n bits are removed, in response to a received message frame including no RTS frame; where n is an integer greater than or equal to 0.

The transmission connection may not use the RTS/CTS mechanism to transmit the data frame, i.e., the transmission connection is not used to transmit the RTS frame and the CTS frame. Here, the data frame sending end may add n bits to the data frame, to prolong the transmission duration of the data frame, so that the time that the data frame arrives at the data frame receiving end may be postponed and further the difference with the random backoff duration of the transmission connection having the maximum random backoff parameter can be compensated, to ensure that the time that the data frame of each transmission connection arrives at the data frame receiving end may be the same. Here, the n bits may be added to an end of the data frame. After adding the n bits to the data frame, the length field in the data frame needs to be changed based on the length of the data frame added with the n bits. The length field is located in a signal (SIG) subdomain of a physical header of the data frame.

The n bits may have preset values, such that the data frame receiving end may determine the n bits added to the message frame after receiving the data frame added with the n bits, removes the n bits added to the data frame, and reads a data content of the data frame after the n bits are removed.

In this way, by adding a predetermined content to the message frame such as the RTS frame and the data frame, the transmission duration of the message frame is prolonged, so that the time that the data frame of each transmission connection arrives at the data frame receiving end equals to the time that the data frame of the transmission connection having the maximum radon backoff parameter arrives at the data frame receiving end, thus improving a success rate of the synchronization transmission.

A specific example is provided in combination of any above embodiment.

If the random numbers generated in all of the plurality of transmission connections are not the same, in order to meet requirements of the synchronization transmission, the following method may be used.

1, Padding the Message Frame

Bits may be added to the RTS frame, or bits may be added to the data frame sent.

Since the RTS frame and the data frame use different MCSs, the data frame may be padded with the bits, the bits may be attached to an end of the data frame.

The length of the added bits may be determined based on the transmission duration of the added bits. The transmission duration of the added bits may be: (max (link1 backoff, link2 backoff, . . . )−the random backoff parameter of the transmission connection)*the time slot duration, where max (link1 backoff, link2 backoff, . . . ) represents the maximum random backoff parameter in the random backoff parameters of all the transmission connections.

2, Duration Field a, in order to avoid presence of a hidden node, a RTS/CTS mechanism is used to transmit data.

Each transmission connection performs counting based on the random backoff parameter of itself. In each transmission connection, based on the frame length of the RTS frame, the data frame sending end may set the length field of the SIG subdomain in the physical header of the RTS frame, and set the duration indicated by the duration field in the MAC frame header to: the length of the data frame+the length of the CTS fame+3*SIFS+ACK+(max (link1 backoff, link2 backoff, . . . )−the random backoff parameter of itself)*the time slot duration. The transmission duration of the data frame may be the transmission duration of the original data frame not added with the n bits. When the data frames are continuous data frames, the duration related to the SIFS in the duration indicated by the duration field may be set to: (the number of sub-frames in the continuous data frame+3)*the duration of the SIFS.

The data frame receiving end may set the duration indicated by the duration field in the MAC frame header of the CTS frame to: the length of the data frame+2*SIFS+ACK+ (max (link1 backoff, link2 backoff, . . . )−the random backoff parameter of itself)*the time slot duration. The transmission duration of the data frame may be the transmission duration of the original data frame not added with the n bits.

The data frame sending end may set the duration indicated by the duration field in the MAC frame header of the data frame to: the length of the data frame+1*SIFS+ACK+(max (link1 backoff, link2 backoff, . . . )−the random backoff parameter of itself)*the time slot duration. The transmission duration of the data frame may be the transmission duration of the original data frame not added with the n bits.

b, the RTS/CTS mechanism is not used to transmit data and the transmission connection directly sends the data frame.

The data frame is directly sent, and a backoff counting method is the same as the above step a. In each transmission connection, the length field of the SIG subdomain of the physical header of the data frame, and the length of the duration field in the MAC frame header is the length of the data frame+1*SIFS+ACK+(max (link1 backoff, link2 backoff, . . . )−the random backoff parameter of itself)*the time slot duration. The transmission duration of the data frame may be the transmission duration of the original data frame not added with the n bits.

When the data frames are continuous data frames, the duration related to the SIFS in the duration indicated by the duration field may be set to: (the number of sub-frames in the continuous data frame+3)*the duration of the SIFS.

Figure 6:
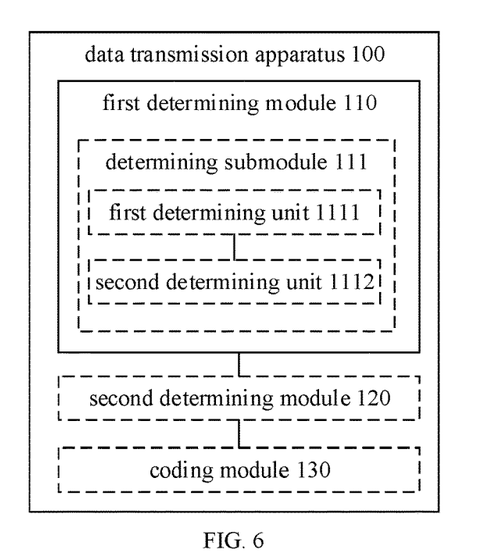
FIG. 6 is a block diagram illustrating a data transmission apparatus according to an embodiment of the disclosure.

The embodiment of the disclosure further provides a data transmission apparatus, applied to a first communication device in a wireless communication. FIG. 6 is a block diagram illustrating a data transmission apparatus 100 according to an embodiment of the disclosure. As illustrated in FIG. 6, the apparatus 100 includes a first determining module 110.

The first determining module 110 is configured to, for a synchronization transmission of a plurality of transmission connections, determine a frame length of a message frame transmitted through each transmission connection based on a maximum random backoff parameter of the plurality of transmission connections, in response to at least two of the plurality of transmission connections having different random backoff parameters.

In an embodiment, the first determining module 110 includes a determining submodule 111, configured to add n bits to an original frame length of the message frame based on the maximum random backoff parameter and a random backoff parameter of the transmission connection through which the message frame is transmitted; where n is an integer greater than or equal to 0.

In an embodiment, a transmission duration of the n bits is a product of a time slot duration and a difference between the maximum random backoff parameter and the random backoff parameter of the transmission connection through which the message frame is transmitted.

In an embodiment, the determining submodule 111 includes a first determining unit 1111, configured to add the n bits to an original frame length of a request to send (RTS) frame or a data frame in response to the message frame transmitted through the transmission connection including the RTS frame.

In an embodiment, the determining submodule 111 includes a second determining unit 1112, configured to add the n bits to an original frame length of a data frame in response to the message frame transmitted through the transmission connection including no RTS frame.

In an embodiment, the apparatus 100 further includes a second determining module 120, configured to determine a duration that the transmission connection occupies a channel resource and which is indicated by a duration field of the message frame based on a transmission duration of the n bits.

In an embodiment, the apparatus 100 further includes a coding module 130, configured to use a same modulation and coding scheme (MCS) for the n bits added to the message frame and a content other than the n bits in the message frame.

Figure 7:
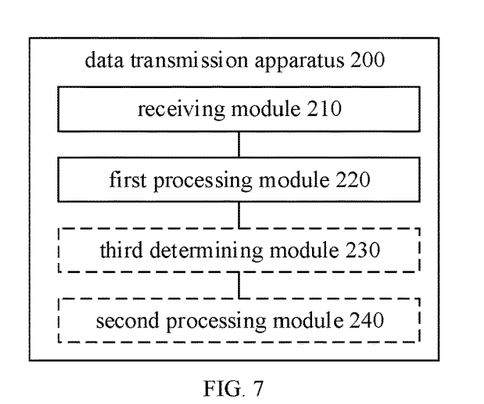
FIG. 7 is a block diagram illustrating a data transmission apparatus according to another embodiment of the disclosure.

The embodiment of the disclosure further provides a data transmission apparatus, applied to a second communication device in a wireless communication. FIG. 7 is a block diagram illustrating a data transmission apparatus 200 according to an embodiment of the disclosure. As illustrated in FIG. 7, the apparatus 200 includes a receiving module 210.

The receiving module 210 is configured to receive a plurality of message frames transmitted in a synchronization transmission mode based on a plurality of transmission connections.

A frame length of a message frame transmitted through each transmission connection is determined based on a maximum random backoff parameter of the plurality of transmission connections in response to at least two of the plurality of transmission connections having different random backoff parameters.

In an embodiment, the apparatus 200 further includes a first processing module 220. The first processing module 220 is configured to, in response to a received message frame including a request to send (RTS) frame, remove n bits added to the RTS frame and read a data content of the RTS frame after the n bits are removed; or remove n bits added to a data frame included in the received message frame and read a data content of the data frame after the n bits are removed; where n is an integer greater than or equal to 0.

In an embodiment, the apparatus 200 further includes a third determining module 230, configured to determine a duration that the transmission connection occupies a channel resource and which is indicated by a duration field of a clear to send (CTS) frame based on a transmission duration of the n bits; and send the CTS frame.

In an embodiment, the apparatus 200 further includes a second processing module 240, configured to remove n bits added to a data frame and read a data content of the data frame after the n bits are removed, in response to a received message frame including no RTS frame; where n is an integer greater than or equal to 0.

In the embodiments, the first determining module 110, the second determining module 120, the coding module 130, the receiving module 210, the first processing module 220, the third determining module 230 and the second processing module 240 may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general processors, controllers, micro controller units (MCUs), microprocessors, or other electronic components, to execute the above method.

Figure 8:
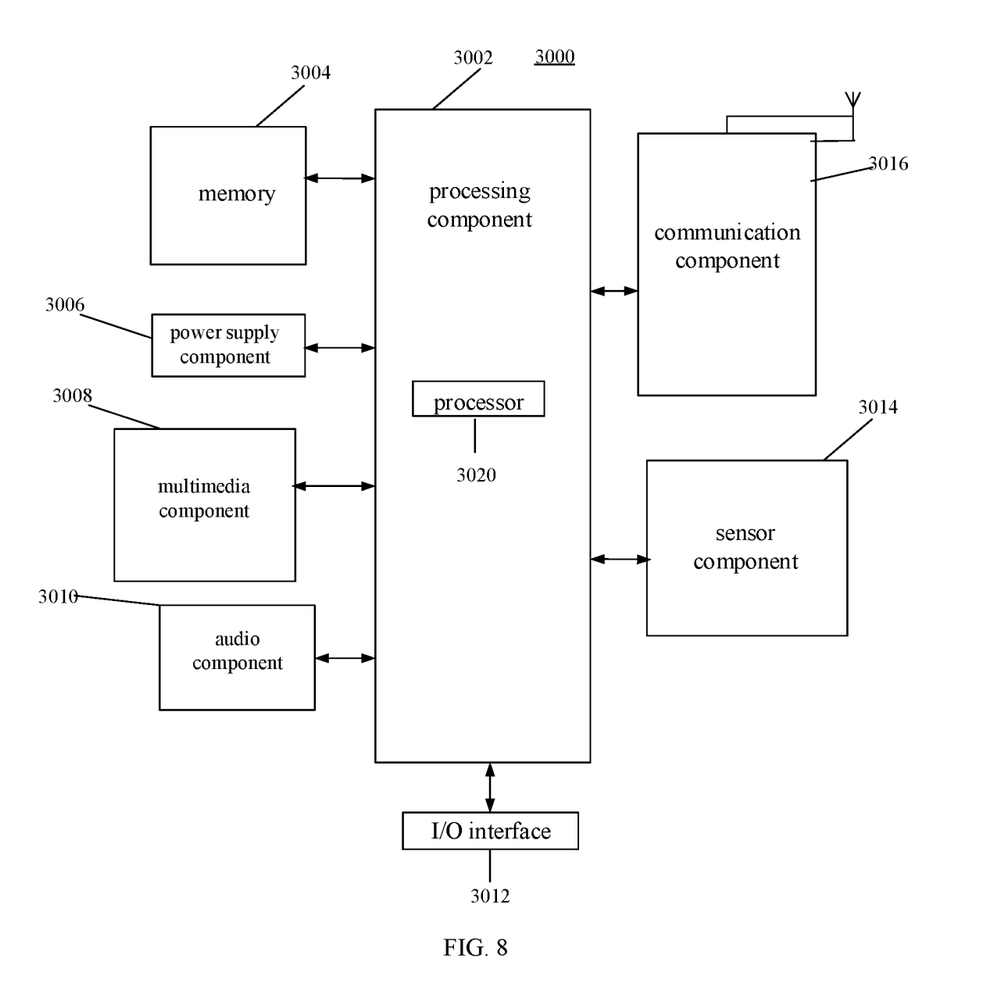
FIG. 8 is a schematic diagram illustrating a data transmission device according to another embodiment of the disclosure.

FIG. 8 is a block diagram illustrating a device 3000 configured to perform data transmission according to an embodiment. For example, the device 3000 may be a mobile phone, a computer, a digital broadcasting UE, a messaging device, a game console, a tablet device, a medical equipment, a fitness equipment, a personal digital assistant, and so on.

Referring to FIG. 8, the device 3000 may include one or more components of the followings: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the whole operation of the device 3000, such as the operations related to display, phone call, data communication, camera operation and recording operation. The processing component 3002 may include one or more processors 3020 to perform instructions, to complete all or part of blocks of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the device 3000. Examples of the data include the instructions of any applications or methods operated on the device 3000, contact data, phone book data, messages, pictures, videos, etc. The memory 3004 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 3006 may provide power for all components of the device 3000. The power supply component 3006 may include a power supply management system, one or more power supplies, and other units related to generating, managing and distributing power for the device 3000.

The multimedia component 3008 includes an output interface screen provided between the device 3000 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 3008 includes a front camera and/or a rear camera. When the device 3000 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 3010 is configured to output and/or input an audio signal. For example, the audio component 3010 includes a microphone (MIC). When the device 3000 is in an operation mode, such as a call mode, a record mode, and a speech recognition mode, the microphone is configured to receive the external audio signal. The received audio signal may be further stored in the memory 3004 or sent via the communication component 3016. In some embodiments, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The button may include but not limited to a home button, a volume button, a start button and a lock button.

The sensor component 3014 includes one or more sensors, configured to provide various aspects of status assessment for the device 3000. For example, the sensor component 3014 may detect the on/off state of the device 3000 and the relative positioning of the component. For example, the component is a display and a keypad of the device 3000. The sensor component 3014 may further detect the location change of the device 3000 or one component of the device 3000, the presence or absence of contact between the user and the device 3000, the orientation or acceleration/deceleration of the device 3000, and the temperature change of the device 3000. The sensor component 3014 may include a proximity sensor configured to detect the existence of the objects nearby without any physical contact. The sensor component 3014 may further include a light sensor such as a complementary metal oxide semiconductor (CMOS) or a charge-coupled device (CCD) image sensor, which is configured to use in imaging applications. In some embodiments, the sensor component 3014 may further include an acceleration transducer, a gyroscope sensor, a magnetic sensor, a pressure sensor or a temperature sensor.

The communication component 3016 is configured for the convenience of wire or wireless communication between the device 3000 and other devices. The device 3000 may access wireless networks based on communication standard, such as Wi-Fi, 2G or 3G, or their combination. In an embodiment, the communication component 3016 receives broadcast signals or broadcast-related information from an external broadcast management system via a broadcast channel. In an embodiment, the communication component 3016 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the device 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 3004 including executable instructions, the executable instructions may be executed by the processor 3020 of the device 3000 to complete the above methods. For example, the non-transitory computer-readable storage medium may be a ROM, a random access memory (RAM), a CD-ROM, a magnetic tape, a floppy disk, an optical data storage device, etc.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

The invention claimed is:

1. A data transmission method, performed by a first communication device, comprising:
for a synchronization transmission of a plurality of transmission connections, determining a frame length of a message frame transmitted through each transmission connection based on a maximum random backoff parameter of the plurality of transmission connections, in response to at least two of the plurality of transmission connections having different random backoff parameters;

wherein, determining the frame length of the message frame transmitted through each transmission connection based on the maximum random backoff parameter of the plurality of transmission connections comprises:

adding n bits to an original frame length of the message frame based on the maximum random backoff parameter and a random backoff parameter of the transmission connection through which the message frame is transmitted;

wherein a transmission duration of the n bits is a product of a time slot duration and a difference between the maximum random backoff parameter and the random backoff parameter of the transmission connection through which the message frame is transmitted, where n is an integer greater than 0.

2. The method of claim 1, wherein adding the n bits to the original frame length of the message frame comprises:

adding the n bits to an original frame length of a request to send (RTS) frame in response to the message frame transmitted through the transmission connection comprising the RTS frame.

3. The method of claim 1, wherein adding the n bits to the original frame length of the message frame comprises:

adding the n bits to an original frame length of a data frame of the message frame.

4. The method of claim 1, further comprising:

determining a duration that the transmission connection occupies a channel resource and which is indicated by a duration field of the message frame based on a transmission duration of the n bits.

5. The method of claim 1, further comprising:

using a same modulation and coding scheme (MCS) for the n bits added to the message frame and a content other than the n bits in the message frame.

6. A data transmission method, performed by a second communication device, comprising:

receiving a plurality of message frames transmitted in a synchronization transmission mode based on a plurality of transmission connections;

wherein a frame length of the message frame transmitted through each transmission connection is determined based on a maximum random backoff parameter of the plurality of transmission connections in response to at least two of the plurality of transmission connections having different random backoff parameters;

wherein the frame length of the message frame is determined by adding n bits to an original frame length of the message frame based on the maximum random backoff parameter and a random backoff parameter of the transmission connection through which the message frame is transmitted; wherein a transmission duration of the n bits is a product of a time slot duration and a difference between the maximum random backoff parameter and the random backoff parameter of the transmission connection through which the message frame is transmitted, where n is an integer greater than 0.

7. The method of claim 6, further comprising:

in response to a received message frame comprising a request to send (RTS) frame, removing n bits added to the RTS frame and reading a data content of the RTS frame after the n bits are removed.

8. The method of claim 7, further comprising:

determining a duration that the transmission connection occupies a channel resource and which is indicated by a duration field of a clear to send (CTS) frame based on a transmission duration of the n bits; and sending the CTS frame.

9. The method of claim 6, further comprising:

removing n bits added to a data frame comprised in a received message frame and reading a data content of the data frame after the n bits are removed.

10. A communication device, comprising: a processor, a receiver, a memory and an executable program stored on the memory and executed by the processor;

wherein, when the processor executes the executable program, the processor is caused to perform the following:

for a synchronization transmission of a plurality of transmission connections, determining a frame length of a message frame transmitted through each transmission connection based on a maximum random backoff parameter of the plurality of transmission connections, in response to at least two of the plurality of transmission connections having different random backoff parameters;

wherein, determining the frame length of the message frame transmitted through each transmission connection based on the maximum random backoff parameter of the plurality of transmission connections comprises:

adding n bits to an original frame length of the message frame based on the maximum random backoff parameter and a random backoff parameter of the transmission connection through which the message frame is transmitted;

wherein a transmission duration of the n bits is a product of a time slot duration and a difference between the maximum random backoff parameter and the random backoff parameter of the transmission connection through which the message frame is transmitted, where n is an integer greater than 0.

11. The device of claim 10, wherein adding the n bits to the original frame length of the message frame comprises:

adding the n bits to an original frame length of a request to send (RTS) frame in response to the message frame transmitted through the transmission connection comprising the RTS frame.

12. The device of claim 10, wherein adding the n bits to the original frame length of the message frame comprises:

adding the n bits to an original frame length of a data frame of the message frame.

13. The device of claim 10, wherein the processor is further caused to perform:

determining a duration that the transmission connection occupies a channel resource and which is indicated by a duration field of the message frame based on a transmission duration of the n bits.

14. The device of claim 10, wherein the processor is further caused to perform:

using a same modulation and coding scheme (MCS) for the n bits added to the message frame and a content other than the n bits in the message frame.

15. A communication device, comprising: a processor, a receiver, a memory and an executable program stored on the memory and executed by the processor;

wherein, when the processor executes the executable program, the processor is caused to perform the data transmission method of claim 6.

* * * * *